(12) United States Patent
Jacobowitz

(10) Patent No.: US 8,555,454 B2
(45) Date of Patent: Oct. 15, 2013

(54) SQUEEGEE-INTEGRATED PUMPED-DRAIN AND HEATER WINDSHIELD WIPER SYSTEM

(75) Inventor: Lawrence Jacobowitz, Boynton Beach, FL (US)

(73) Assignee: Integrated Wiper Technologies, LLC, Boynton Beach, FL (US)

( * ) Notice: Subject to any disclaimer, the term of this patent is extended or adjusted under 35 U.S.C. 154(b) by 0 days.

(21) Appl. No.: 13/616,624

(22) Filed: Sep. 14, 2012

(65) Prior Publication Data

US 2013/0192014 A1 Aug. 1, 2013

Related U.S. Application Data

(63) Continuation-in-part of application No. 13/364,243, filed on Feb. 1, 2012.

(51) Int. Cl.
*B60S 1/52* (2006.01)
*B60S 1/48* (2006.01)
*B60S 1/38* (2006.01)

(52) U.S. Cl.
USPC .......... 15/250.04; 15/250.48; 15/250.07; 15/250.361; 318/DIG. 2

(58) Field of Classification Search
USPC .......... 15/250.01–250.09, 250.43, 250.44, 15/250.361, 250.48, 250.41, 250.002, 15/250.003; 318/DIG. 2; 239/284.1
See application file for complete search history.

(56) References Cited

U.S. PATENT DOCUMENTS

| | | | | |
|---|---|---|---|---|
| 1,982,345 A | | 11/1934 | Kirby | |
| 2,034,880 A | * | 3/1936 | Sackett | 15/250.07 |
| 2,069,699 A | * | 2/1937 | Dohler | 15/250.04 |
| 2,469,791 A | * | 5/1949 | Schneider | 15/250.07 |
| 2,786,224 A | * | 3/1957 | Dembosky | 15/250.08 |
| 2,865,040 A | * | 12/1958 | Hamm | 15/250.06 |
| 3,032,797 A | * | 5/1962 | Presser | 15/250.04 |
| 3,082,464 A | * | 3/1963 | Smithers | 15/250.201 |
| 3,716,886 A | | 2/1973 | Klomp | |
| 3,825,966 A | * | 7/1974 | Hall | 15/250.04 |
| 3,936,901 A | | 2/1976 | Theckston | |
| 4,194,261 A | * | 3/1980 | Parkinson | 15/250.07 |
| 4,285,470 A | * | 8/1981 | Roth | 239/284.2 |
| 4,928,344 A | | 5/1990 | Bliss | |

(Continued)

FOREIGN PATENT DOCUMENTS

| | | | |
|---|---|---|---|
| DE | 2705700 | * | 8/1978 |
| DE | 19844017 | * | 4/2000 |
| JP | 5-310102 | * | 11/1993 |
| WO | WO00/64714 | * | 11/2000 |

OTHER PUBLICATIONS

Machine language translation of description portion of DE2705700, published Aug. 1978.*

(Continued)

*Primary Examiner* — Gary Graham
(74) *Attorney, Agent, or Firm* — Saile Ackerman LLC; Stephen B. Ackerman

(57) ABSTRACT

A windshield wiper having a unitary structure including: a blade with a spine; at least one drain including a plurality of inlets, integrated with the blade such that the at least one drain is aligned with a flow path of precipitation guided up the blade sidewall. A coupler for connects the at least one drain via tubing to a pump. A system incorporating the windshield wiper and vehicles having the system installed are disclosed.

52 Claims, 4 Drawing Sheets

(56) References Cited

U.S. PATENT DOCUMENTS

| | | |
|---|---|---|
| 5,065,471 A | 11/1991 | Laplante |
| 5,221,828 A | 6/1993 | Basheer et al. |
| 5,603,856 A | 2/1997 | Bischoff |
| 5,655,251 A | 8/1997 | Dileo et al. |
| 5,676,868 A | 10/1997 | Simmons |
| 7,007,340 B1 * | 3/2006 | James ........................ 15/250.41 |
| 7,009,356 B2 * | 3/2006 | Tanida .......................... 318/483 |
| 7,555,806 B1 | 7/2009 | James |
| 2011/0047738 A1 * | 3/2011 | Gross et al. ................ 15/250.04 |
| 2013/0036570 A1 * | 2/2013 | Hartman ..................... 15/250.31 |

OTHER PUBLICATIONS

Machine language translation of description portion of DE 19844017, published Apr. 2000.*

Machine language translation of description portion of WO 00/64714, published Nov. 2000.*

* cited by examiner

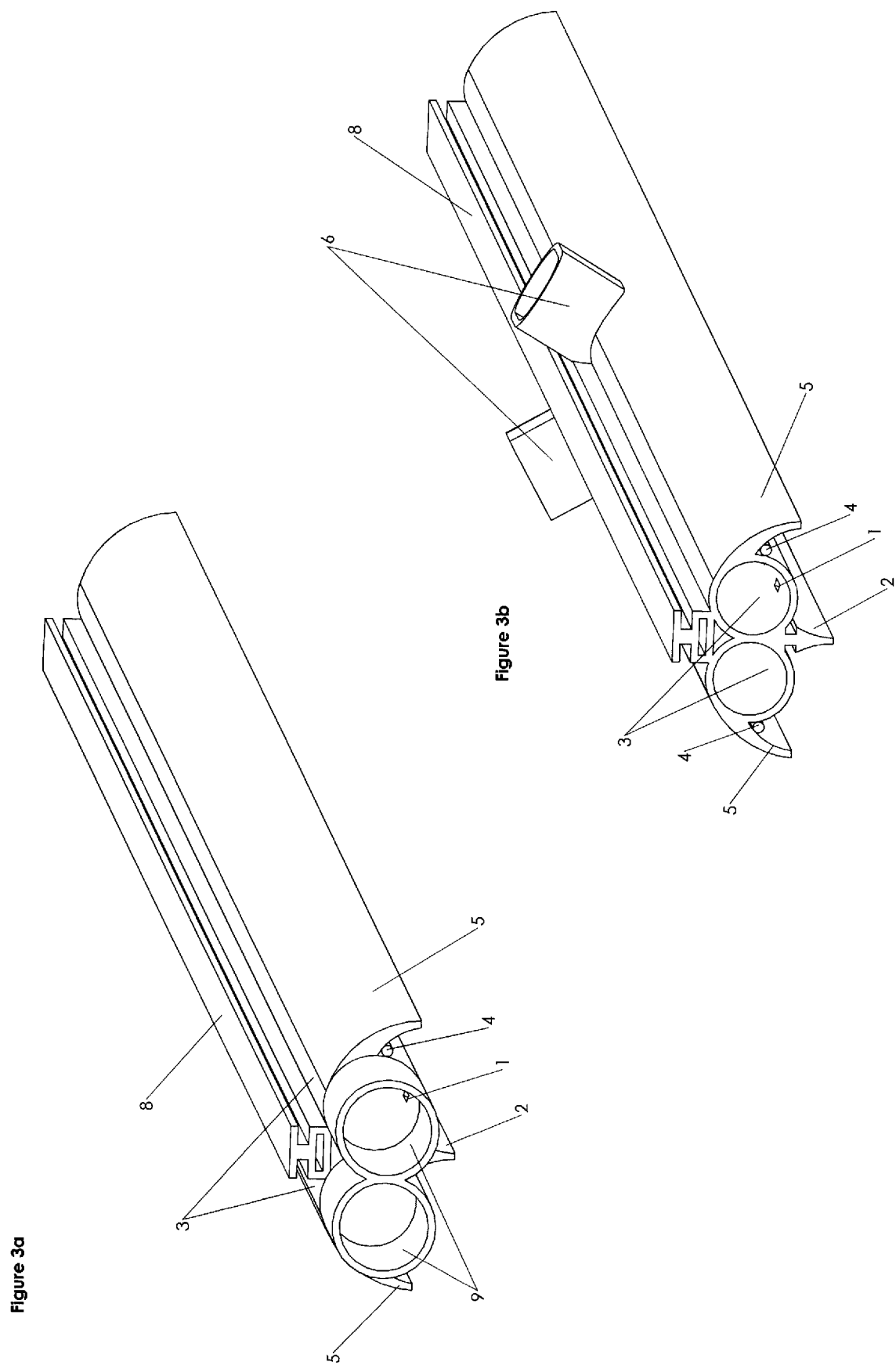

SQUEEGEE-INTEGRATED PUMPED-DRAIN AND HEATER WINDSHIELD WIPER SYSTEM

RELATED APPLICATION

This is a continuation-in-part application of U.S. patent application Ser. No. 13/364,243, filed Feb. 1, 2012, which is incorporated by reference in its entirety, and is assigned to the same assignee as the instant application.

BACKGROUND

1. Field

The present disclosure relates to motor vehicles, and more particularly to improved functionality and integration in windshield wiping methods, apparatus and design for manufacturability.

2. Description of the Related Art

For the many advances in automotive technology, there have been surprisingly few advances assuring visibility during precipitation driven by truly inclement weather. That is, since the invention of windshield wipers in 1903, over a century has passed without a solution that can provide users with adequate clearing of heavy rain, ice or snow. In order to provide some context, aspects of a prior art windshield wiper are introduced.

Referring to FIG. 5, there is shown a prior art windshield wiper 51. The prior art windshield wiper 51 includes a blade, or squeegee, 52. The blade 52 is generally fabricated from rubber, a soft polymer or other similar material that provides for a "squeegee" action, that is, an action that sipes water away from an exterior surface of a windshield (i.e., expels water from the surface). The blade 52 is attached to a spine 53. The spine 53 provides a rigidity required to ensure downward pressure which is delivered through an arm 57 and upon the blade 52 is effectively communicated along a length, L, of the prior art windshield wiper 51. In common embodiments of the prior art windshield wiper 51, the pressure is evenly distributed through a suspension system that includes components such as at least one primary armature 54 and often a secondary armature 55. As is commonly recognized, the secondary armature 55 often includes a single coupling 56 for coupling of the prior art windshield wiper 51 to the arm 57. The arm 57 is driven by a motor and mechanical assembly (not shown) which provides for repetitive travel of the prior art windshield wiper 51 across a viewing area of the windshield. More recently, flat beam-blades have been implemented based on press-fit leaf spring blades inserted in longitudinal grooves above the squeegee.

Present day windshield wipers 51 are generally useful in limited to light rain and often are inadequate to handle a large volume of rain, such as during intense downpours. In intense rainstorms, wiper blades are unable to displace the high volumes of water. Generally, the wipers smear the rain into blurring sheets and create very limited visibility through the windshield. Increasing the speed of the traverse of the wiper has been useful, but this also causes limitations in visibility. Further, high speeds can cause excessive wear to a wiper system. These problems have been persistent in the auto industry for over a century. Other problems with present day windshield wipers 51 are known.

For example, while windshield defrosters can help in freezing weather, present day internal, in-cab, heated and fan blown air windshield defrosters are manifestly ineffective in melting ice deposited on surfaces of the prior art windshield wiper 51. Any one that has driven in icing weather recognizes that the glass windshield is a poor thermal conductor for heat transfer to the squeegee blade of the typical windshield wiper. At low ambient temperatures, ice forming on the various parts of the prior art windshield wiper 51 results in dangerously poor visibility for automobile, bus and truck drivers alike.

Various attempts have been made to address icing on wiper blades. Among these are designs that conduct heat to the wiper blade 52. However, efforts involving conduction heating are inefficient and generally ineffective. That is, as silicone rubbers and synthetic polymer equivalents used in wiper squeegees are good thermal insulators, the designs fail to perform as intended.

The prior art has been unable to solve the problems associated with the thermal insulator property of flexible rubber or polymer windshield wiper blades. The thermodynamics of heat transfer are poorly realized in prior art implementations which teach embedding wires into channels opened into the thermally insulating wiper blade body. Considering the radiation emission pattern of a wire to be that of a cylindrical isotropic radiator, the majority of the heat energy is lost into directions not effective for melting ice on the blade-edge and sidewalls.

Some other efforts have addressed the thermal conductivity limitation by additions of carbon-based materials such as carbon-fibers or graphite or nanoparticle admixtures in the materials used in the blade 52. These solutions enhance thermal conductivity with an attendant increase in the cost of materials. Notably all polymer and rubber materials suffer diminished lifetimes resulting from conductive thermal cycling associated with heating and cooling of the blade.

Likewise, embedding resistive wires into the wiper blades (i.e., heating a thermal insulator) reflects an attempt to overcome the fundamental physics involved. For the same reason, conduction heating of insulators is inappropriate. Heated windshield fluids distributed through capillary tubes have been reported to have caused fires or burn injuries.

With the millions of drivers on the road today, and the frequent presentment of rain and snow hazards, an improved windshield wiper is of great need. The improvements should be cost effective, and be equipped to limit the impact of precipitation for the variety of inclement conditions that confront drivers around the world.

SUMMARY

One object of the disclosure is a vehicular rain removal system that significantly increases fluid flow-rate and maximum fluid-capacity, to overcome the failure-point limit of visibility.

Another object of the disclosure is a vehicular rain removal system which includes drain structures, which can be dynamically pumped with an adaptive flow-rate proportional to the intensity of rainfall.

Another object of the disclosure is to enable further increases in rain removal fluid capacity in coupled wiper pair configurations through sensor-based control circuits and selectable pump sharing configurations.

Another object of the disclosure is to enable increased operational reliability of a rain removal system comprised of a pair of wipers, in the event of a single pump failure.

A further object of the disclosure is improved manufacturability of a vehicular rain removal system.

Another object of the disclosure is improved thermodynamic efficiency for a heated wiper capable of defrosting ice and snow.

A further object of the disclosure is to teach design integration for functional maximization, providing a multiplicity of requisite utilities within a single wiper, including windshield washer cleaning fluid dispersal along the wiper blade.

These and other objects are achieved by a windshield wiper comprising a blade having a length, at least one drain having a plurality of inlets, with the drain formed adjacent to the blade and to the length, and a spine adjacent to the drain, wherein the blade, the drain, and the spine are a unitary structure.

These and other objects are further achieved by a system for removing precipitation from a windshield, comprising a windshield wiper made up of a blade having a length, at least one drain having a plurality of inlets, the drain formed adjacent to the blade and to the length, a spine adjacent to the drain, wherein the blade, drain, and spine are a unitary structure. The windshield wiper is mounted on a wiper arm, with at least one coupler for coupling the drain to tubing that leads to at least one pump that is capable of applying a negative pressure to the drain and pumping the precipitation from the drain via the tubing.

The above objects are still further achieved by a vehicle comprising a rain removal system for wiping a windshield, the vehicle including a windshield, and a windshield wiper having a blade with a length, at least one drain having a plurality of inlets, the drain formed adjacent to the blade and to the length, a spine adjacent to the drain, wherein the blade, the drain, and the spine are a unitary structure. The windshield wiper is mounted on a wiper arm, and there is further at least one coupler for coupling the drain to tubing that leads to at least one pump capable of applying a negative pressure to the drain and pumping the precipitation from the windshield. The windshield wiper is mounted to the vehicle for providing wiping of precipitation from the windshield during operation of the vehicle.

These objects are also achieved by a method of manufacturing a windshield wiper comprising forming a blade having a length, forming at least one drain having a plurality of inlets, the drain formed adjacent to the blade and to the length, wherein the blade and drain are formed in a single manufacturing step of a single material.

BRIEF DESCRIPTION OF THE DRAWINGS

The foregoing and other features and advantages of the disclosure are apparent from the following detailed description taken in conjunction with the accompanying drawings in which:

FIG. 3a is a side perspective view of the windshield wiper of FIG. 2a with end-pump fluidic connector.

FIG. 3b is a side perspective view of the windshield wiper of FIG. 2a with center-pump fluidic connector.

DETAILED DESCRIPTION

Disclosed herein are an expanded functionality and integration of a windshield wiper, windshield wiping system and methods for making use of the various components. Among other objectives, the teachings herein provide for efficiencies in fabrication not previously realized.

For example, the teachings herein provide for effective heating of a wiper blade on a windshield as well as active removal of excess water as may occur in intensive rain.

As an overview, the integrated windshield wiping system according to the teachings herein provides for active removal of precipitation deposited onto a windshield. The windshield wiper includes components for, among other things, pumping away the precipitation. In some embodiments, the windshield wiper (also referred to as the "wiper," or as a "squeegee") includes heating elements for actively heating during operation.

Figure 1:
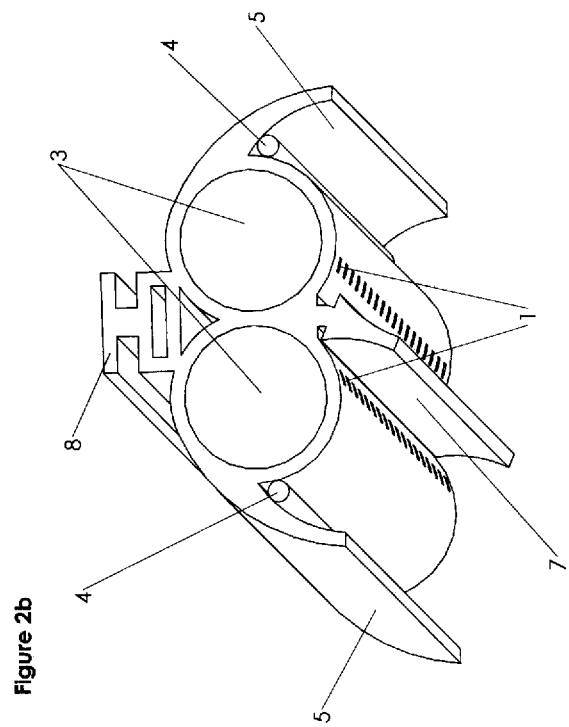
FIG. 1 is a perspective cross-sectional view of a windshield wiping system disclosed herein.

Referring now to FIG. 1, there is shown a cross-sectional view of an exemplary windshield wiper 11. In this example, the windshield wiper 11 includes drain conduits directly integrated into the body of the squeegee during fabrication. Exemplary components include the spine 8, at least one drain tube 3, and a squeegee 2 in contact with glass windshield surface 10. Generally, a coupler, shown in FIG. 3a as element 9 for end-coupling, and in FIG. 3b as element 6 for center-coupling, serves to provide fluidic connection to an external supply of positive or negative pressure, and may further provide for physical attachment of the windshield wiper 11 to the arm 57 shown in FIG. 5. In some embodiments, the coupler is integrated into each of the at least one drain tube 3. For example, each drain tube 3 may include at least one of coupler 6 or coupler 9, where the coupler is inserted into the drain tube 3 or on one end (such as a, lower end) of the drain tube 3.

In other embodiments, the coupler 6 may be a part of a connector for electrical and fluidic conduits. The connector may be any one of a variety of embodiments. In a preferred embodiment, the connector is an H-connector that provides for interconnection of two generally parallel drain tubes 3. Each of the drain tubes generally runs along the length, L, of the wiper blade. In some embodiments, the connector is disposed in approximately the center of the length, L. Advantageously, this provides for efficient pressure balancing of intake into each of the drain tubes 3. In embodiments involving other configurations of drain tubes 3, the connector may include other configurations. That is, for example, in an embodiment making use of a single drain tube 3, the connector may appear as an inverted "T" form or "Y" form. Additional embodiments of the connector are discussed further below.

The wiper may be coupled to the arm 57 using a prior art connecting device, or through some other form of connection. For example, a combination mechanical/fluidic connection may be used (such as with the coupler 9). In embodiments making use of a prior art connection to the arm 57, fluidic connection to the coupler 9 may be accomplished via tubing run internally through the arm 57.

Figure 5:
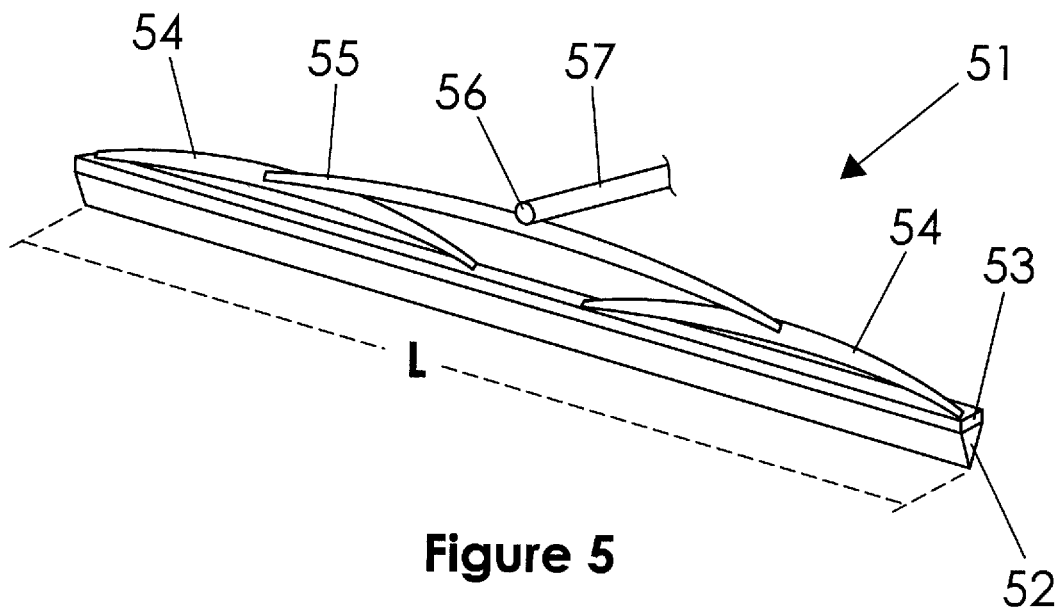
FIG. 5 provides a perspective view of a prior art windshield wiper.

The wiper is preferably a unitary structure, that is, functionally related structural elements formed in an optimum composite form-factor. Portions of the disclosed wiper may be formed in a single manufacturing process of a single material, such as extruded liquid silicone rubber, moulded or milled rubber, or a polymer with elastic and/or lubricating properties. The wiper may also be assembled from various parts (such as by bonding, gluing or welding). The wiper blade may be assembled from segmented parts, include at least one hinge (such as along the length, L) or include other similar devices. In short, known or later devised manufacturing techniques and apparatus may be used. In general, the wiper blade is fabricated so as to provide for desired rigidity and conformity with the windshield, as well as to provide an integrated structure for containing the components disclosed herein. In the non-limiting examples provided, the wiper blade is shaped to enable compatibility with existing wiper blade designs, known in the industry. These include the traditional armature type as shown in FIG. 5, as well as newer flat beam blade profiles.

The blade 2 can have a cross-section in a V shape, I-beam shape, have straight or curved sidewalls, or have simple or complex variations of these cross-sectional shapes.

It is known in the windshield wiper industry the necessity for the entire wiper blade to bend to the complex contour of the glass windshield to enable conformation of the squeegee edge and optimal contact of the silicone rubber to the glass surface. Gaps between wiper and glass result in smearing of water and related lowering of visibility. Steel "leaf spring(s)" in a flat beam blade may be pre-bent into a curve which flattens the wiper blade when mounted and is used to press the wiper against the glass windshield. Integrating the drains of the disclosure into the rubber body must address not adding rigidity which could interfere with conformity of the blade to the contoured glass windshield surface. The present disclosed wiper replaces existing squeegees having only a triangular pendulum wiping device with one or more integrated drains formed during extrusion (or milling) of the rubber squeegee, and keeps the triangular pendulum, enabling the pumping of a much higher volume of rain water than prior art designs—fluid capacity can be increased up to 10-100 times. Prior art wipers are known to fail at about 51 milliliters per wiper stroke, whereas the disclosed wiper can meet or exceed 500 milliliters per wiper stroke, handling rain fall rates, thus sustaining visibility for the driver of the vehicle.

Figure 6:
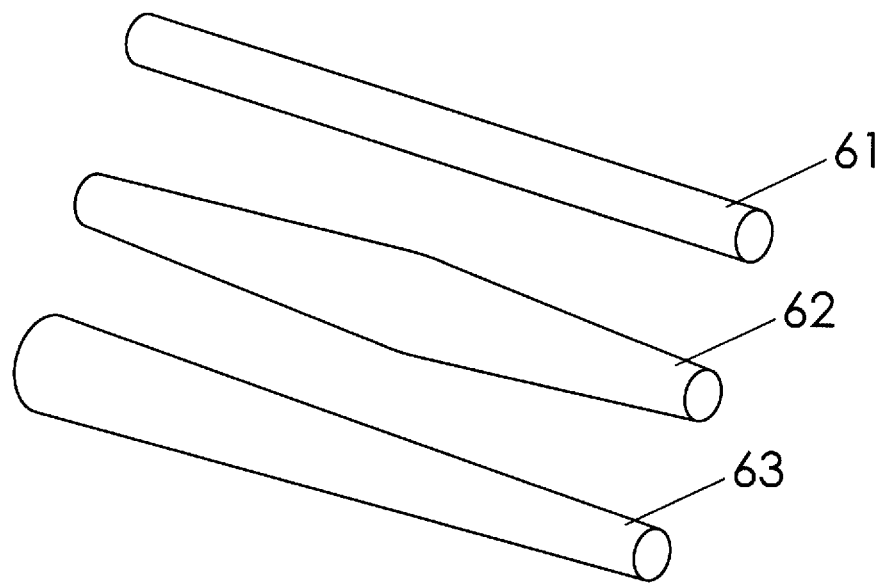
FIG. 6 shows in perspective view various drain tube shapes.

The at least one drain tube 3 is disposed parallel to and along a length of the blade at a variable selected height above the glass windshield. As shown in FIG. 6, the drain tube is preferably cylindrical 61, but alternately may be conical 63 or bi-conical 62 about the center of the drain to linearize pressure drops down the drain-tube length, enabling a uniform pressure distribution. The distal end may be a smaller cross-sectional dimension than the proximal end—the conical shape 63—for an end-pumping embodiment. The mid-point 'diameter' of the drain may be larger than both proximal and distal end-points, resulting in bi-conical shape 62, in the center-pumping embodiment, pre-compensating for pressure drops along the length of the drain-tube to assure uniform suction and associated nominal flow-rates via the inlet apertures. The at least one drain tube 3 is, in cross-section, preferably circular, but may alternately be elliptical, rectangular, or variations of these geometric cross-sections. Means for internal structural support may be inserted into the drain channels to obviate potential inward motion of the channel walls under vacuum suction.

Referring now also to FIG. 3a and FIG. 3b, there is shown a cross-sectional view of an exemplary embodiment of the windshield wiper 11. The blade 8 is coupled to an armature by at least one mount. The mount may be integrated into the squeegee at the time of manufacture or added after manufacture. The mount may also be substantially of length, L. In other embodiments, a plurality of low-profile mounts (i.e., short in consideration of the length, L) may be included (e.g., three to five or so mounts). The at least one mount may rely on a variety of mounting techniques. For example, each mount may be a clip, a retainer or the like. More specifically, where the mount is a retainer, the mount may include an open profile into which the blade 8 is inserted (as shown in FIG. 3a and FIG. 3b). In these embodiments, the mount may rely on friction-fitting to ensure retention of the blade 8. In short, the mount provides for mounting of the blade 8 to the superstructure in a manner that provides for retention of the blade 8 as well as desired operational performance of the blade 8.

Figure 2A:
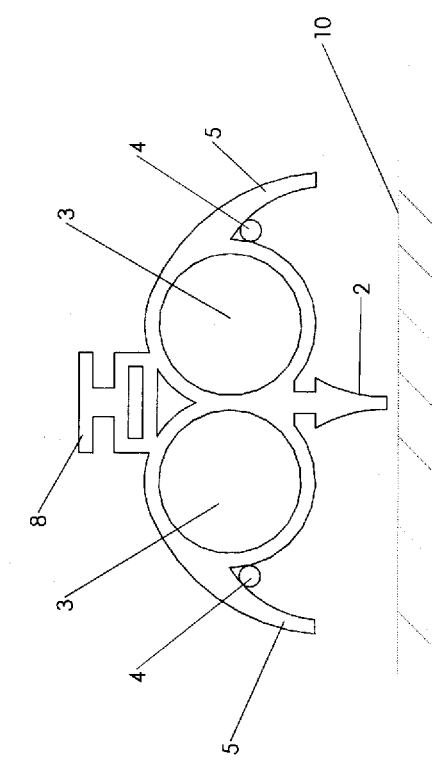
FIG. 2a is an underside perspective view of the integrated drain and squeegee configuration.
Figure 2B:
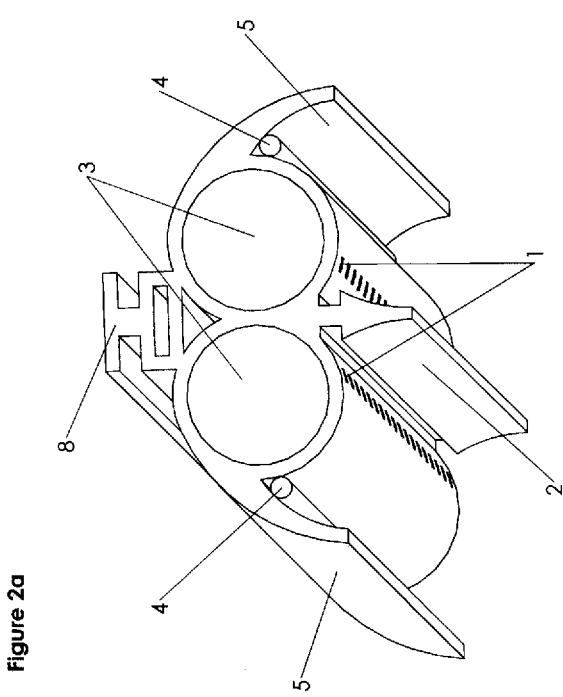
FIG. 2b is an underside perspective view of the deflected squeegee edge.

Referring now to FIGS. 2a and 2b, an underside of the wiper 11 is shown. In these examples, it may be seen that each of the drain tubes 3 includes at least one of couplers 6 or 9. Each of the couplers 6 or 9 is mated with a leg of the H-connector, T-connector or Y-connector. Each of the drains 3 generally includes a plurality of inlets 1—shown in FIGS. 2a and 2b—which face inward towards the squeegee sidewall. When the windshield wiper 11 is in operation (thus travelling back and forth), the wiper 11 lead the precipitation into the inlets 1. As will be discussed later herein, a negative pressure pulled on each of the drains 3 draws the precipitation into the inlets 1 of the drain tubes 3 and out through the coupler 6 or 9. However, for purposes of introduction, pumping may be controlled manually, in a dogmatic fashion (such as where it is adjusted according to another parameter, such as wiping speed), through computer control (such as with input from a rain sensor on board the vehicle) or by other techniques deemed appropriate.

Generally, the bottom of each drain tube 3 is configured to be contiguous with the upper surface of the squeegee sidewall such that rain water is pushed or displaced by the squeegee edge in contact with the windshield glass 10 to drive the water upward into a directed or guided path from the glass windshield along the squeegee sidewall surface into the multiple inlet apertures in each drain tube. The contiguous rain flow path is enabled by the integration of the drain tubes into the body of the squeegee, as taught in the present disclosure. That is, the oscillatory motion of the squeegee 2 results in a maximum deflection angle defined as the auto-stop position which occurs at the end of the mechanical range of the squeegee motion where the base of the approximately inverted triangular squeegee contacts the planar surface directly above it, as shown in FIG. 2b illustrating the case of sweeping to the right. Mirror image effects are seen when symmetrically sweeping to the left. In this end-of-range position, the bottom of the drain tube is effectively contiguous with the squeegee upper sidewall, providing alignment with the flow-guided rain for optimum rain water collection and removal by tube transport under pumping to an effluent location under the hood or an isolated location away from the windshield. The inlet 1 hole patterns may be linear, grouped, have variable spacings between inlet openings, have inlet openings with geometric cross-sections selected from square, circular, elliptical or other shapes, and have tapers or contours perpendicular to or at a selected angle of entry into the drain. The inlet hole sizes may be fixed, or may be stepped in gradient fashion in diameter, or have combinations of inlet hole size, inlet to inlet spacings, and have patterns selectable, all for water collection efficiency optimization.

The inlets along the drain are disposed at an angle to the glass windshield for optimum fluid collection efficiency, residing at the surface of the drain nearest to the squeegee sidewall. In the configurations taught in the present disclosure, the approximately upper-half of the drain channel is mechanically integrated and, hence mechanically supported, to mitigate against potential collapse of the channel during vacuum pumping. The approximately lower-half of the drain channel, 3, shown in FIG. 2b may be bonded with a ribbon or mesh of thinly insulated resistive wire, 4, such as Nichrome or other suitable conductors like carbon nanotubes, fibres, or co-extruded coatings applied to the exposed drain channel surface, and, provides mechanical support to mitigate against partial collapse of that section of the drain surface inward when vacuum pumping is applied, and serves as a heater. The heater may be formed by co-extruding with a lubricant elastomer a matrix carrier of electrically conducting particles or fibers to form a sub-surface layer functionally equivalent to a wire conductor with an insulator sheath.

This combination of integration and surface bonding of heater elements assures the mechanical integrity and utility of the drain channels, 3, and inlets, 1, during dynamic pumping of fluids collected from the squeegee displacements, and reduces the thickness required for the drain walls. The positioning of the heater elements and the curvature of the tandem overhanging wings 5, as shown in FIGS. 1-3b, enable a radiative heating zone analogous to the well-known effect of parabolic solar reflectors to focus radiated heat onto the squeegee sidewalls, the squeegee edge in contact with the glass windshield, and, concurrently to the fluid flowing within the drain channel. The wings 5 are preferably curved—in the cross-sectional view of FIG. 1—with a concave inner surface, however they may also be other shapes such as straight extensions out from drains 3.

The drains 3 may optionally be reinforced, to prevent collapse of the sidewalls during pump suction, by inserting plastic or metal supports in a simple insertion assembly step not requiring bonding to a housing, in such a way that the inlets are not occluded, such as by using a longitudinal slit or slot overlaying the line of inlet openings 1. The drain walls are preferably about 1 mm thick. The inserts allow for connection of drain tube channels to the tubing to the pump.

Ice formation of impinging precipitation is thereby obviated by radiatively raising the air temperature and target wiping element surfaces above the freezing point. The hemicylinder surrounding the squeegee sidewalls and edge are preferably elevated to a temperature sufficient to obviate the freezing of incident precipitation. The method of radiant heating taught in the present disclosure, is advantageous with respect to alternative prior art methods wherein heater elements are embedded in tunnels of the thermally insulating rubber squeegee to conductively transfer heat to inhibit ice formation or to defrost existing ice, and, result in outgassing solvents important to the lifetime and mechanical elasticity of the rubber.

It is similarly pointed out that the present disclosure teaches an integrated squeegee structure which simplifies the manufacturing process by direct incorporation of the drains and elimination of drain parts inventory and additional assembly and bonding steps for drain attachment. Within the set of alternative embodiments for the present disclosure's design concepts of applying active vacuum suction into drain conduits is the direct incorporation of inlet openings in each of the sidewalls of the water pushing element 2 of FIG. 1.

In the examples shown, there are two heaters 4, each heater being disposed along an opposing side of the blade 11. As will be discussed in greater detail herein, each of the heaters 4 may be controlled manually, thermostatically or through other techniques deemed appropriate to switch on the heater at a predetermined set-point temperature or by a thermistor circuit allowing for adaptation to variable wind and temperature ambient conditions and controlled by a microprocessor or embedded controller.

In an alternative embodiment, a coaxial longitudinal annular opening is formed during extrusion about the drain channel, enabling a hollow or, alternately, solid, cylinder of resistive material to be formed to comprise a radiative heater. Ambient conditions of wind velocity, ambient temperature, amount of incident precipitation, and other variables will determine how many Watts will be required to defrost the wiper blade.

The windshield wiper 11 may include an arc or other shape. The shaping may be included to account for curvature of a particular windshield, enabling a surface compliant wiper, or flat beam-blade.

Having thus disclosed aspects of the windshield wiper 11, it should be recognized that a variety of additional embodiments may be had and other features may be provided. For example, independent operation of wipers may be desired. The windshield wiper 11 may be used to evenly dispense washer fluid, such as by reversing of pump action or reverse biasing of the pump motor, to provide positive rather than negative pressure. This would enable the windshield washer fluid out of what are otherwise drain inlets, longitudinally distributing the washer fluid along the wiper blade. Thus, the same apparatus can be used to both drain rain from the windshield and to dispense in a controlled locus washer fluid from a reservoir tank.

In some embodiments, at least one end of the drain tubes are closed, that is, has a sidewall that is orthogonally oriented to the sidewall.

In some embodiments, a secondary connector is provided. In these embodiments, the secondary connector may be coupled to another pump, thereby providing for auxiliary or redundant pumping.

In some embodiments, the coupler 6 or 9, the connector and the drain tube 3 are provided as a unitary structure (such as as a product of injection molding). In other embodiments, some of these components are combined.

Figure 4B:
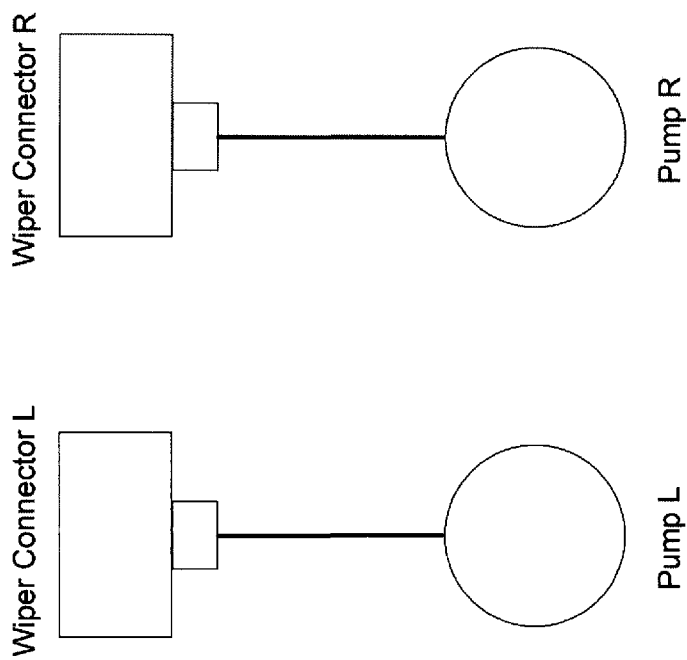
FIG. 4b is a system configuration illustration of both wipers sharing a single pump.
Figure 4A:
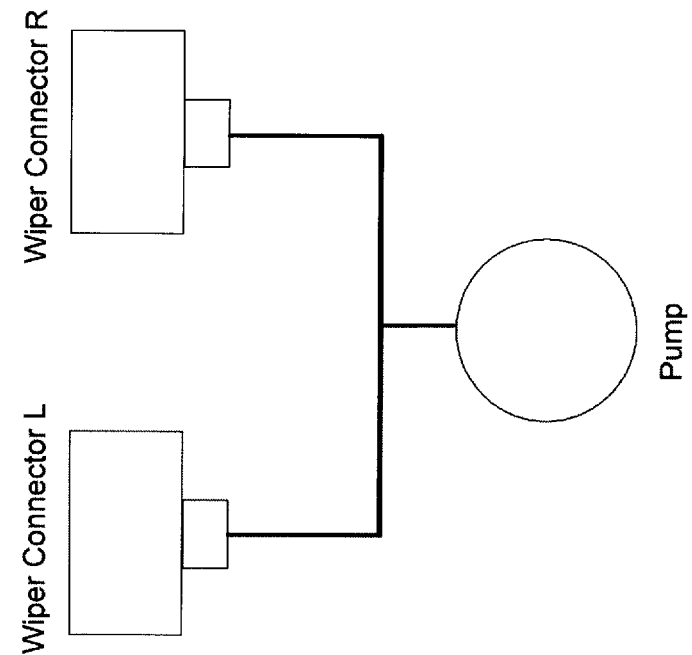
FIG. 4a is a system configuration illustration showing a dedicated pump for the left-side windshield wiper (L) and the right-side windshield wiper (R).

As shown in FIGS. 4a and 4b, various other components, such as left and right wiper connectors L and R and pumps L and R, may be included. These other components generally support the pumping action (redundant pumps may be included), and aspects of control of the windshield wiper 11. Among other things, the system that is provided with the windshield wiper may control parameters such as pump rates, direction of flow, wiper speed and the like. A control system may provide for automated operation, and may use a variety of sensors (such as a temperature sensor and a rain sensor) as control inputs. Each of the driver and passenger side windshield wipers may have a dedicated pump, as shown in FIG. 4a, or a shared pump, as in FIG. 4b, configured with directly connected couplers carrying tubing between each drain and a pump, or, via cross-coupled connecting couplers between each drain and each pump.

In summary, the teachings herein provide for an advanced windshield wiping system. The windshield wiping system provides for efficient wiping action with actively pumped rain removal not previously achieved by passive mechanical displacement wipers of prior art in a variety of inclement conditions.

It should be recognized that the windshield wiping system may be disposed upon any vehicle were visibility during inclement weather conditions is a concern. For example, the windshield wiping system may be installed in an automobile, a truck, a train, an airplane or a boat.

In support of the teachings herein, various additional components may be used that have not been specifically discussed herein. Components include, without limitation, types of pumps, sensors, heating systems, hoses, sources of pressure (negative and positive), valves and the like. Aspects of the windshield wiping system may be controlled by electronics including a digital system and/or an analog system. The system(s) may have components such as a processor, logic circuits, storage media, memory, input, output, communications link, user interfaces, software and firmware programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs) or magnetic (disks, hard drives) storage devices, or any other type that when executed causes a computer to implement the method of the present disclosure. These instructions may provide for equipment operation, control, data collection and analysis and other functions deemed relevant by a system designer, owner, user or other such personnel, in addition to the functions described in this disclosure.

A controller for controlling at least one of a rate of pumping, heating and a speed of wiping, may include at least one microprocessor or microcontroller for the switch-on and operations of servocontrol of at least one of the following functions. One such function is varying the flow-rate as a function of voltage or current from an input sensor circuit, such as, but not limited to, a rain-sensor circuit. Another function is heater output power control, as measured for example in Wattage, to effect a desired ambient temperature under variable ambient conditions of air temperature, moisture content, wind velocity and others, to control the switching on of the heater and limiting the upper-value of wattage generated. Yet another function of the contoller is servocontrol of the interrelationships between a pair of windshield wipers on the driver's and on the passenger sides of the windshield, such as, but not limited to, relative pump rates, spatial positional phasing, wiper motor speed, roll-over to an at least 2nd pump in the event of a reliability failure of one of the pumps, augmentation of a first pump by a second pump to match rain-rate conditions, the cross-coupling of wipers on driver and passenger sides, and related requirements. Another controller function is reversal of pump flow direction, as for example, but not limited to, reverse bias of the voltage supply to the at least one pump, enabling 'flush out' for debris removal within the rain removal subsystem, or, switching from suction from drain inlet apertures to driving windshield washer fluid from a reservoir out the drain apertures for windscreen cleaning, either with the reversed suction pump or with a separate reservoir pump.

The various components that may be used to provide for functionality of the windshield wiping system may serve at least one other function. For example, computer executable instructions may be implemented by a processor provided for controlling other functions within a vehicle.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the disclosure disclosed.

It should be recognized that relative terms such as "substantially" do not imply any particular limitations. For example, one element may be of a length, L, while other elements may be substantially of the length, L, and may therefore be longer, shorter or of an equal length. "Segmented" refers to, among other things, an article that is divisible (i.e., divided) into smaller components, which may exhibit some or all of the features of the larger article.

While the disclosure has been described with reference to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A windshield wiper comprising:
    a blade having a length;
    at least one drain having a plurality of inlets, said at least one drain formed adjacent to said blade and to said length; and
    a spine adjacent to said at least one drain;
    wherein said blade, said at least one drain, and said spine are a unitary structure; and
    at least one heater for providing, heat within a hemi-cylinder surrounding sidewalls and an edge of said blade, capable of being elevated to a temperature sufficient to obviate freezing of incident precipitation, wherein said heater is bonded to at least one said drain, and provides mechanical support to said drain during drain pumping.

2. The windshield wiper of claim 1, wherein the heater comprises a resistive heater.

3. The windshield wiper of claim 1, wherein said hemi-cylinder further comprises at least one wing adjacent to said heater, and said hemi-cylinder focuses radiated heat onto said sidewalls of said blade, and onto an edge of said blade in contact with a glass windshield, and concurrently onto fluid flowing into and through said drain.

4. The windshield wiper of claim 1, further comprising a coupler for coupling the at least one drain to tubing that leads to a pump.

5. The windshield wiper of claim 4, wherein said pump is capable of applying a negative pressure to the at least one drain and pumping precipitation from the drain via said tubing and said inlets.

6. The windshield wiper of claim 5, wherein said pump is capable of being reversed, in order to supply windshield washing fluid through the at least one drain to a windshield surface.

7. The windshield wiper of claim 1, wherein the blade cross-section is a V shape, I-beam shape, have straight or curved sidewalls, or simple or complex variations of said cross-sectional shapes.

8. The windshield wiper of claim 1, wherein the at least one drain is disposed parallel to and along the length of the blade, at a selected height above a glass windshield.

9. The windshield wiper of claim 1, wherein the at least one drain comprises two drains arranged side-by-side, centered above said blade and below said spine.

10. The windshield wiper of claim 1, wherein the at least one drain is conical, or bi-conical about the center of the drain, to linearize pressure drops along the length of the drain.

11. The windshield wiper of claim 1, wherein said inlets allow for a passage of water into said drain.

12. The windshield wiper of claim 1, wherein said inlets are linear or grouped, and have constant or variable spacings between said inlets, are of constant or variable size, and wherein the cross-sectional shape of said inlet opening comprise square, circular, or elliptical.

13. The windshield wiper of claim 1, wherein said inlets have tapers or contours perpendicular to or at a selected angle of entry into the drain, and are fixed or stepped in gradient fashion in diameter.

14. The windshield wiper of claim 1, further comprising a coupler between the at least one drain and tubing to at least one pump, wherein said coupler is positioned at a mid-point of the drain, with both ends of said drain capped.

15. The windshield wiper of claim 1, further comprising a coupler between the at least one drain and tubing to at least one pump, wherein said coupler is positioned at an end-point of the drain, with an opposite end of said drain capped.

16. The windshield wiper of claim 1, further comprising a coupler between the at least one drain and tubing to at least one pump, wherein said tubing removes effluent either to a vehicle drain system or under a vehicle hood.

17. The windshield wiper of claim 1, configured with a second such windshield wiper on a vehicle, wherein each wiper has a dedicated pump.

18. The windshield wiper of claim 1, configured with a second such windshield wiper on a vehicle, wherein both wipers share a pump.

19. The windshield wiper of claim 1, wherein a mount for retaining the wiper comprises one of a suspension system for legacy armatures, or for flat beam-blades.

20. The windshield wiper of claim 1 wherein a bottom of each said drain is configured to be contiguous with an upper surface of a sidewall of said blade, such that during operation rain water is pushed by an edge of said blade in contact with a windshield to drive the rain water upward into said inlets in each said drain.

21. The windshield wiper of claim 1 wherein said heater comprises a ribbon or mesh of thinly insulated resistive wire, wherein said wire is nichrome, or carbon nanotubes or fibers.

22. A system for removing precipitation from a windshield, comprising:
a windshield wiper comprising:
a blade having a length;
at least one drain having a plurality of inlets, said at least one drain formed adjacent to said blade and to said length;
a spine adjacent to said at least one drain;
wherein said blade, said at least one drain, and said spine are a unitary structure;
at least one heater adjacent to said at least one drain:
said windshield wiper mounted on a wiper arm;
at least one coupler for coupling the at least one drain to tubing that leads to at least one pump that is capable of applying a negative pressure to the at least one drain and pumping said precipitation from the drain via said tubing;
at least one pump connected via tubing to said at least one drain;
a rain sensor; and
a controller for controlling at least one of a rate of pumping and a speed of wiping, comprised of at least one microprocessor or microcontroller, wherein said controller varies a pump flow rate based on input from said rain sensor.

23. The system of claim 22 wherein said controller controls a switching on/off of said heater, to effect a desired ambient temperature under variable ambient conditions of air temperature, moisture content, wind velocity and others.

24. The system of claim 22 wherein said system comprises a pair of windshield wipers and controls pump rates at each of said windshield wipers, spatial positional phasing, wiper motor speed, roll-over to an at least second pump in the event of a reliability failure of a first pump, and augmentation of a first pump by a second pump to match rain-rate conditions.

25. The system of claim 22 wherein said controller is capable of reversing pump flow direction, enabling a flushing out of debris removal within said system, or driving windshield washer fluid from a reservoir for windshield cleaning.

26. The system of claim 25 wherein said reversing of pump flow direction is with either a reversed suction pump or with a separate reservoir pump.

27. The system of claim 22, further comprising said at least one heater for providing heat residing within a hemi-cylinder surrounding sidewalls and an edge of said blade, capable of being elevated to a temperature sufficient to obviate freezing of incident precipitation.

28. The system of claim 27, wherein the heater comprises a resistive heater.

29. The system of claim 27, wherein said hemi-cylinder further comprises at least one wing adjacent to said heater, and said hemi-cylinder focuses radiated heat onto the sidewalls of said blade, and onto an edge of said blade in contact with a glass windshield, and concurrently onto the fluid flowing into and through said drain.

30. The system of claim 27 wherein said heater comprises a ribbon or mesh of thinly insulated resistive wire, wherein said wire is nichrome, or carbon nanotubes or fibers.

31. The system of claim 27 wherein said heater is bonded to at least one said drain, and provides mechanical support to said drain during drain pumping.

32. The system of claim 22, further comprising a coupler for coupling the at least one drain to tubing that leads to a pump.

33. The system of claim 22, wherein the blade cross-section is a V shape, I-beam shape, have straight or curved sidewalls, or simple or complex variations of said cross-sectional shapes.

34. The system of claim 22, wherein the at least one drain is disposed parallel to and along the length of the blade, at a selected height above a glass windshield.

35. The system of claim 22, wherein the at least one drain comprises two drains arranged side-by-side, centered above said blade and below said spine.

36. The system of claim 22, wherein the at least one drain is conical, or bi-conical about the center of the drain, to linearize pressure drops along the length of the drain.

37. The system of claim 22, wherein said inlets allow for a passage of water into said drain.

38. The system of claim 22, wherein said inlets are linear or grouped, and have constant or variable spacings between said inlets, are of constant or variable size, and wherein the cross-sectional shape of said inlet opening comprise square, circular, or elliptical.

39. The system of claim 22, wherein said inlets have tapers or contours perpendicular to or at a selected angle of entry into the drain, and are fixed or stepped in gradient fashion in diameter.

40. The system of claim 22, further comprising a coupler between the at least one drain and tubing to at least one pump, wherein said coupler is positioned at a mid-point of the drain, with both ends of said drain capped.

41. The system of claim 22, further comprising a coupler between the at least one drain and tubing to at least one pump, wherein said coupler is positioned at an end-point of the drain, with an opposite end of said drain capped.

42. The system of claim 22, further comprising a coupler between the at least one drain and tubing to at least one pump, wherein said tubing removes effluent either to a vehicle drain system or under a vehicle hood.

43. The system of claim 22, configured with a second such windshield wiper on a vehicle, wherein each wiper has a dedicated pump.

44. The system of claim 22, configured with a second such windshield wiper on a vehicle, wherein both wipers share a pump.

45. The system of claim 22, wherein a mount for retaining the wiper comprises one of a suspension system for legacy armatures, or for flat beam-blades.

46. The windshield wiper of claim 22, wherein said pump is capable of applying a negative pressure to the at least one drain and pumping precipitation from the drain via said tubing and said inlets.

47. The system of claim 22, wherein said pump is capable of being reversed, in order to supply windshield washing fluid through the at least one drain to a windshield surface.

48. The system of claim 22 wherein a bottom of each said drain is configured to be contiguous with an upper surface of a sidewall of said blade, such that during operation rain water is pushed by an edge of said blade in contact with a windshield to drive the rain water upward into said inlets in each said drain.

49. The system of claim 22 wherein said controller is capable of dynamically pumping said precipitation with an adaptive flow rate proportional to the intensity of said precipitation.

50. The system of claim 22 wherein said said heater is capable of being controlled manually by a user of said system, or thermostatically by said controller at a predetermined setpoint temperature, or by said controller using a thermistor circuit.

51. A vehicle comprising a rain removal system for wiping a windshield, the vehicle comprising:
   a windshield; and
   a windshield wiper comprising:
      a blade having a length;
      at least one drain having a plurality of inlets, said at least one drain formed adjacent to said blade and to said length;
      a spine adjacent to said at least one drain, wherein said blade, said at least one drain, and said spine are a unitary structure;
   said windshield wiper mounted on a wiper arm;
   at least one coupler for coupling the at least one drain to tubing that leads to at least one pump that is capable of applying a negative pressure to the at least one drain and pumping said precipitation from the windshield;
   wherein the windshield wiper is mounted to the vehicle for providing wiping of precipitation from the windshield during operation of the vehicle; and
   at least one heater for providing heat within a hemi-cylinder surrounding sidewalls and an edge of said blade, capable of being elevated to a temperature sufficient to obviate freezing of incident precipitation, wherein said heater is bonded to at least one said drain, and provides mechanical support to said drain during drain pumping.

52. The vehicle of claim 51 comprising one of an automobile, a truck, a train, an airplane or a boat.

* * * * *